United States Patent
Kawaharada et al.

(10) Patent No.: US 10,715,396 B2
(45) Date of Patent: Jul. 14, 2020

(54) SUPPORT APPARATUS, NON-TRANSITORY COMPUTER READABLE RECORDING MEDIUM AND SETTING METHOD

(71) Applicant: OMRON Corporation, Kyoto (JP)

(72) Inventors: Akio Kawaharada, Kyoto (JP); Nobuyuki Takuma, Kyoto (JP); Hiromu Suganuma, Kyoto (JP); Ryosuke Fujimura, Kyoto (JP); Hiroko Kubo, Kyoto (JP)

(73) Assignee: OMRON Corporation, Kyoto (JP)

(*) Notice: Subject to any disclaimer, the term of this patent is extended or adjusted under 35 U.S.C. 154(b) by 0 days.

(21) Appl. No.: 16/275,327

(22) Filed: Feb. 14, 2019

(65) Prior Publication Data

US 2019/0306029 A1  Oct. 3, 2019

(30) Foreign Application Priority Data

Mar. 27, 2018 (JP) ................................. 2018-059967

(51) Int. Cl.
| | | |
|---|---|---|
| H04L 12/24 | (2006.01) | |
| G05B 19/418 | (2006.01) | |
| G05B 9/02 | (2006.01) | |
| G05B 19/042 | (2006.01) | |

(52) U.S. Cl.
CPC ............... *H04L 41/12* (2013.01); *G05B 9/02* (2013.01); *G05B 19/4185* (2013.01); *H04L 41/0803* (2013.01); *G05B 19/0423* (2013.01)

(58) Field of Classification Search
CPC ........................... H04L 41/0803; H04L 41/12
See application file for complete search history.

(56) References Cited

U.S. PATENT DOCUMENTS

| | | | | |
|---|---|---|---|---|
| 2005/0007999 A1* | 1/2005 | Becker | .................... | H04L 67/18 370/352 |
| 2005/0017875 A1* | 1/2005 | Nakayama | ........... | G05B 19/058 340/870.07 |
| 2009/0182858 A1* | 7/2009 | Zhou | .................... | H04L 61/6022 709/223 |
| 2010/0003960 A1* | 1/2010 | Ray | .................... | H04W 52/0261 455/404.2 |
| 2018/0019933 A1* | 1/2018 | Ueda | ..................... | G01R 31/08 |

OTHER PUBLICATIONS

ODVA, "The Common Industrial Protocol (CIP™)", Nov. 15, 2018, Available at: https://www.odva.orgr/Technology-Standards/Common-Industrial-Protocol-CIP/Overview/Overv.

(Continued)

*Primary Examiner* — El Hadji M Sall
(74) *Attorney, Agent, or Firm* — JCIPRNET

(57) ABSTRACT

A support apparatus includes: an obtaining part, which obtains status information respectively from one or a plurality of safety devices network-connected with a control apparatus; a selecting part, which selects the safety device to which device identification information is to be newly set based on the status information of each safety device; and a setting part, which determines and sets corresponding device identification information in accordance with an instruction from a user based on network identification information set for the network to which each safety device belongs and a network address of each safety device.

20 Claims, 11 Drawing Sheets

(56) References Cited

OTHER PUBLICATIONS

Rockwell Automation, "User Manual—POINT Guard I/0 Safety Modules", Jul. 2014, pp. 1-212.
Rockwell Automation, "User Manual—Guard I/0 EtherNet/IP Safety Modules", Nov. 2016, pp. 1-176.
Rockwell Automation, User Manual—Guardlogix 5570 Controllers, May 2017, pp. 1-172.
"Search Report of Europe Counterpart Application", dated Aug. 19, 2019, pp. 1-11.

* cited by examiner

244

| SNN | Network1 |
|---|---|
| IP address 1 | 192.168.1.2 |
| IP address 2 | 192.168.1.3 |
| IP address 3 | 192.168.1.4 |
| ⋮ | ⋮ |

| SNN | Network2 |
|---|---|
| IP address 1 | 192.168.200.2 |
| IP address 2 | 192.168.200.3 |
| IP address 3 | 192.168.200.4 |
| ⋮ | ⋮ |

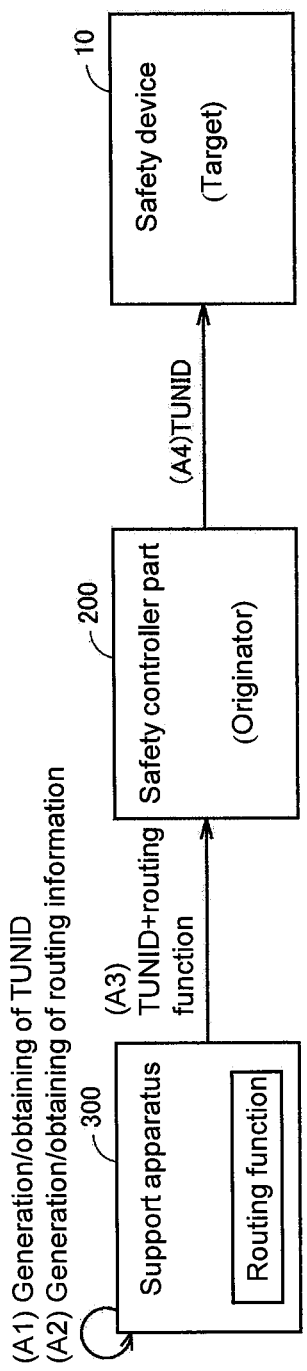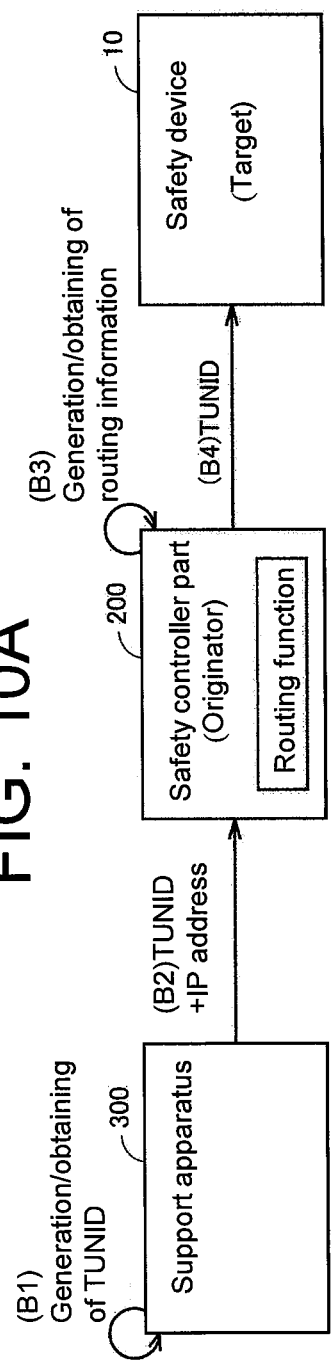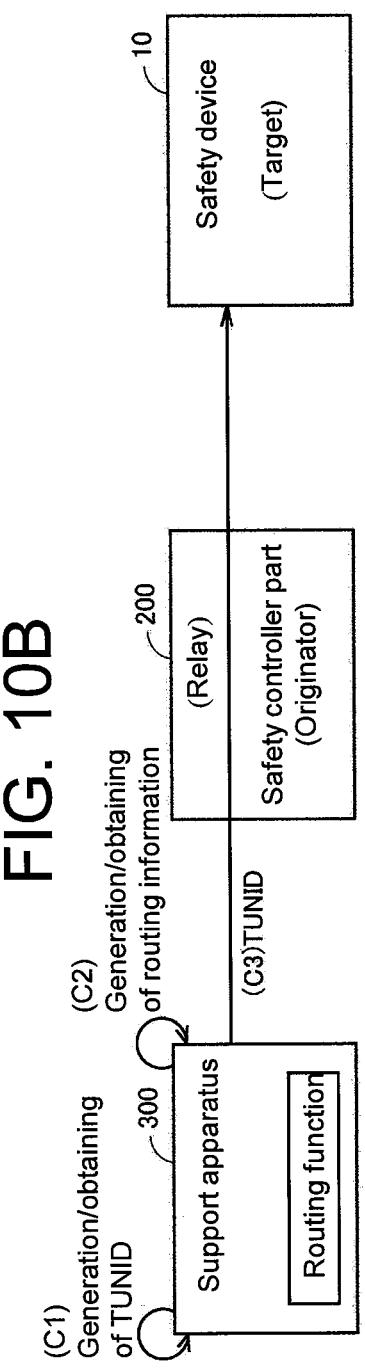

SUPPORT APPARATUS, NON-TRANSITORY COMPUTER READABLE RECORDING MEDIUM AND SETTING METHOD

CROSS-REFERENCE TO RELATED APPLICATION

This application claims the priority of Japan patent application serial no. 2018-059967, filed on Mar. 27, 2018. The entirety of the above-mentioned patent application is hereby incorporated by reference herein and made a part of this specification.

BACKGROUND OF THE DISCLOSURE

Technical Field

The present disclosure relates to a support apparatus, a support program, and a setting method.

Related Art

Conventionally, in the field of FA (factory automation), a system in which a control apparatus and various devices such as a sensor, an actuator or the like are connected via a network is used. With the development of the ICT (Information and Communication Technology), application of more advanced communication technology is progressing.

For example, a network technology, which is managed and provided by the ODVA, Inc. whose headquarters are located in the U.S. and referred to as the CIP (Common Industrial Protocol), can be employed to implement communication between control apparatuses and between a control apparatus and any other device (see non-patent literature 1: ODVA, "The Common Industrial Protocol", [online], [searched on Mar. 15, 2018], Internet <URL: https://www.odva.org/Technology-Standards/Common-Industrial-Protocol-CIP/Overview>).

In order to implement the communication which uses the aforementioned advanced communication technology, the control apparatus and/or the devices which are connected to the same network should be appropriately set respectively. On the other hand, multiple devices may be connected to the same network, and there is a problem that the setting operation is complicated and time-consuming.

SUMMARY

According to an example of this disclosure, a support apparatus capable of communicating with a control apparatus network-connected to one or a plurality of safety devices is provided. Each of the safety devices has a memory part for keeping device identification information that specifies the device itself. The support apparatus includes: an obtaining part, which refers, in each network, to a connection setting list that defines a network address of a safety device belonging to the network, and obtains status information respectively from the one or a plurality of safety devices network-connected to the control apparatus; a selecting part, which selects, based on the status information of each safety device, the safety device to which the device identification information is to be newly set among the one or a plurality of safety devices to which the status information is obtained; and a setting part, which determines and sets corresponding device identification information for each of the selected safety devices in accordance with an instruction from a user based on network identification information set for the network to which each safety device belongs and a network address of each safety device.

According to another example of this disclosure, a support program executed in a computer capable of communicating with a control apparatus network-connected to one or a plurality of safety devices is provided. Each of the safety devices has a memory part for keeping device identification information that specifies the device itself. The support program makes the computer execute: a step to refer, in each network, to a connection setting list that defines a network address of a safety device belonging to the network, and obtain status information respectively from the one or a plurality of safety devices network-connected to the control apparatus; a step to selects, based on the status information of each safety device, the safety device to which the device identification information is to be newly set among the one or a plurality of safety devices to which the status information is obtained; and a step to determine and set corresponding device identification information for each of the selected safety devices in accordance with an instruction from a user based on network identification information set for the network to which each safety device belongs and a network address of each safety device.

According to still another example of this disclosure, a setting method to one or a plurality of safety devices network-connected to a control apparatus is provided. Each of the safety devices has a memory part for keeping device identification information that specifies the device itself. The setting method includes: a step to refer, in each network, to a connection setting list that defines a network address of a safety device belonging to the network, and obtain status information respectively from the one or a plurality of safety devices network-connected to the control apparatus; a step to selects, based on the status information of each safety device, the safety device to which the device identification information is to be newly set among the one or a plurality of safety devices to which the status information is obtained; and a step to determine and set corresponding device identification information for each of the selected safety devices in accordance with an instruction from a user based on network identification information set for the network to which each safety device belongs and a network address of each safety device.

BRIEF DESCRIPTION OF THE DRAWINGS

FIG. 9 is a schematic diagram showing an example of a connection setting list in the safety control system of this embodiment.

FIGS. 10A to 10C are schematic diagrams for describing setting forms of the TUNID in the safety control system of this embodiment.

DESCRIPTION OF THE EMBODIMENTS

Figure 1:
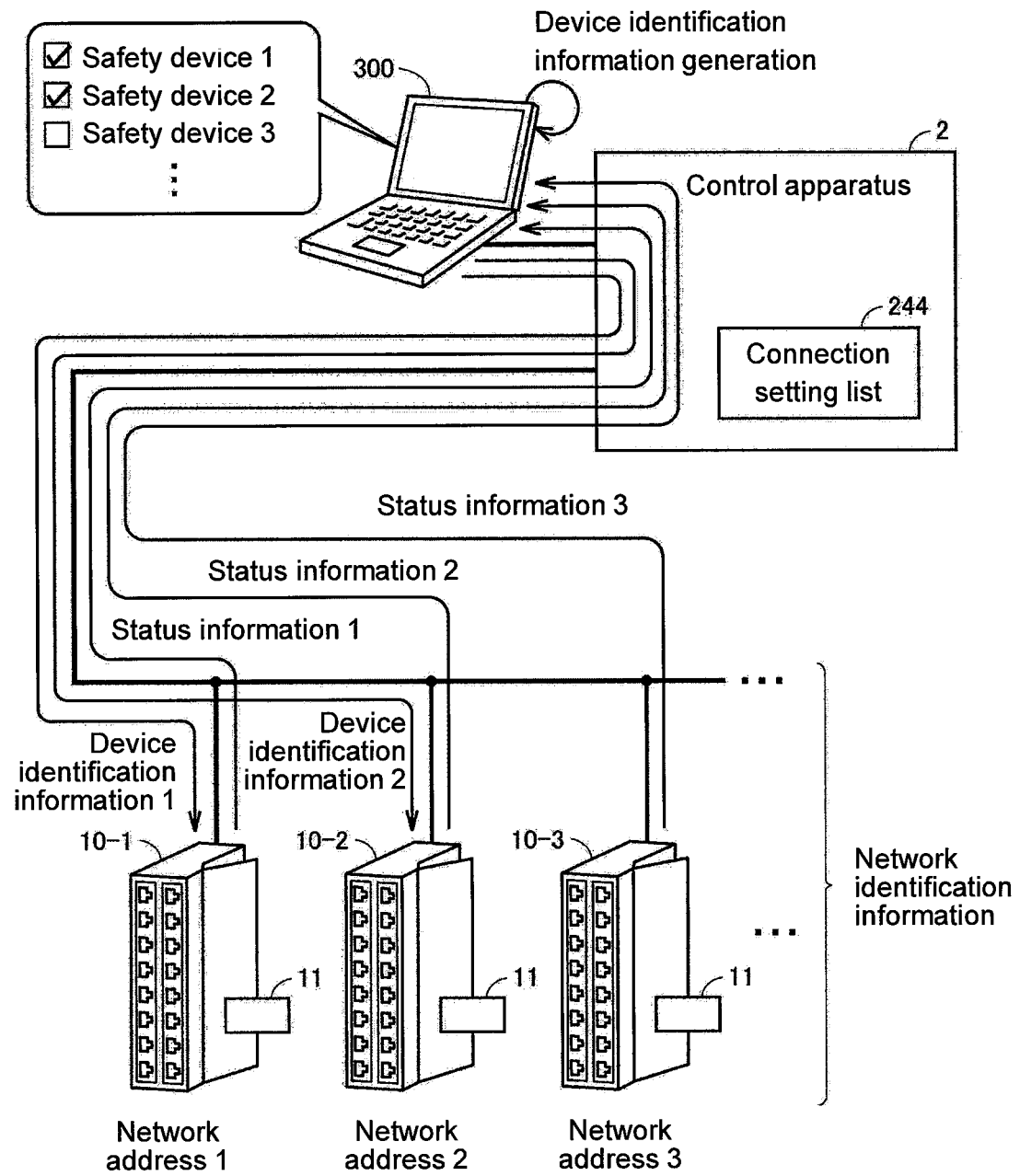
FIG. 1 is a schematic diagram showing a functional configuration example of a safety control system of an embodiment.

The present disclosure provides an approach by which required identification information can be easily set even when multiple safety devices are connected to the same network.

According to this disclosure, the support apparatus obtains the status information from each of the safety devices registered in the connection setting list, and selects the safety devices to which the device identification information is to be newly set based on the obtained status information. Then, the support apparatus sets the device identification information that corresponds to each of the selected safety devices for the selected safety devices. By this function of the support apparatus, the setting of appropriate device identification information can be achieved even when there are multiple safety devices or when a user lacks expertise.

In the aforementioned disclosure, the setting part may obtain routing information that shows a route from the control apparatus to a target safety device and transmits the determined device identification information to the control apparatus, and the control apparatus may transmit the device identification information to the target safety device based on the routing information from the setting part. According to this disclosure, because the support apparatus even generates or obtains the routing information, when the device identification information is transmitted from the control apparatus to multiple safety devices, the route information to each safety device is generated by the support apparatus, and thus the load in the control apparatus can be reduced.

In the aforementioned disclosure, the setting part may transmit the determined device identification information to the control apparatus along with the network address of the target safety device, and the control apparatus may determine the route to the target safety device based on the network address from the setting part and transmits the device identification information to the safety device. According to this disclosure, the support apparatus may transmits the determined device identification information to the control apparatus along with the network address of the target safety device, and transmission of the device identification information to the actual safety device is performed by the control apparatus. Therefore, it is unnecessary to install the routing function and the like on the support apparatus, the configuration is simplified and the load in the support apparatus can be reduced.

In the aforementioned disclosure, the setting part may determine the route to the target safety device and transmits the device identification information to the target safety device. According to this disclosure, the support apparatus directly transmits the device identification information to the target safety device, and thus the control apparatus may perform only data relay between the support apparatus and the safety device. Therefore, the load in the control apparatus can be reduced.

In the aforementioned disclosure, the setting part may obtain, from the device identification information already set to any safety device, the network identification information of the network to which the safety device belongs, and determines the device identification information to other safety devices belonging to the same network as the safety device based on the obtained network identification information. According to this disclosure, addition and the like of new safety devices can be easily performed while maintaining the already set network identification information.

In the aforementioned disclosure, the setting part may set corresponding device identification information after the device identification information already set to the target safety device is cleared temporarily. According to this disclosure, even when information other than the desired device identification information is stored in the target safety device, the risk of being influenced by such information can be reduced.

In the aforementioned disclosure, the support apparatus may further include a reception part which receives from the user an arbitrary selection of the safety device to which the device identification information is to be newly set among one or a plurality of safety devices to which the status information is obtained. According to this disclosure, such an operation that the user intentionally not setting the device identification information can be easily achieved.

In the aforementioned disclosure, the device identification information may be determined based on an IP (Internet Protocol) address of the target safety device and a SNN (Safety Network Number) set to the network to which the target safety device belongs. According to this disclosure, the device identification information in accordance with CIP Safety specification can be generated.

According to the present disclosure, required identification information can be easily set even when multiple safety devices are connected to the same network.

Embodiments of the present disclosure are described in detail with reference to the drawings. Moreover, identical or correspondent parts in the drawings are denoted by identical symbols and the description is not repeated.

A. Application Example

First, an example of a case in which the present disclosure is applied is described. FIG. 1 is a schematic diagram showing a functional configuration example of a safety control system of this embodiment. The safety control system of this embodiment provides, for example, an architecture for achieving function safety stipulated in IEC 61508 and the like.

Typically, the safety control system includes a control apparatus 2 achieving safety control of the function safety, and one or a plurality of safety devices 10-1, 10-2, 10-3 . . . (also generally referred to as "the safety device 10" hereinafter) network-connected to the control apparatus 2.

In this specification, typically, the "standard control" is a general term of treatments for controlling a control target according to a predetermined requirement specification. Besides, in this specification, the "safety control" is a general term of treatments for preventing the safety of a person from being threatened by any malfunction, any equipment or machine or the like. The safety control includes, for example, a treatment in which the control target is stopped not only in a case that behaviour of the control target itself is different from original behaviour but also in a case that any abnormality occurs in the control apparatus 2 itself.

In this specification, the "device" includes apparatuses capable of being connected via an arbitrary network. The device includes at least a portion of a single sensor, a single actuator, a relay apparatus for connecting one or a plurality of sensors or actuators to the network, and various control apparatus such as a robot controller, a temperature controller, a flow amount controller and so on. In particular, the "device" for achieving safety control is also referred to as the "safety device".

The connection between the control apparatus 2 and the safety device 10 is achieved using at least device identification information allocated to each safety device 10. Each safety device 10 has a memory part 11 for keeping the device identification information that specifies the device itself.

Moreover, in this embodiment, regarding the device identification information, the device identification information of each safety device 10 is determined based on network identification information set for the network to which each safety device 10 belongs and network address of each safety device 10.

In this specification, the "network identification information" means the identification information for setting a group of one or a plurality of safety devices 10 connected to the network. The network identification information specifies a range of the network defined by the control apparatus 2. In this embodiment, even when a plurality of safety devices 10 is connected to the same physical network, the safety devices 10 can be logically distinguished by using a plurality of network identification information.

In this specification, the "network address" means the information for physically specifying the safety device 10 connected to the network. Typically, an IP (Internet Protocol) address may be used as the network address. However, a MAC (Media Access Control) address and so on may also be used without being limited to the IP address.

The safety control system further includes a support apparatus 300 capable of communicating with the control apparatus 2.

The support apparatus 300 assists the setting of the device identification information to the safety device 10. Specifically, the support apparatus 300 refers to a connection setting list 244 and respectively obtains status information from one or a plurality of safety devices 10 network-connected to the control apparatus 2.

The connection setting list 244 is a list which defines, for the network defined by the network identification information, the network address of the safety device 10 belonging to this network. The connection setting list 244 is arranged at least on the control apparatus 2, and thus the support apparatus 300 may refer to the connection setting list 244 of the control apparatus 2. However, it is also common that the connection setting list 244 is set on the support apparatus 300 and delivered to the control apparatus 2; therefore, the connection setting list 244 may also be arranged on the support apparatus 300 too. In this case, the support apparatus 300 may access each safety device 10 by referring to the connection setting list 244 kept by the support apparatus 300 itself.

In this specification, the "status information" is a term including information accessible from the target safety device 10. Typically, the status information includes a movement state or various attribute information (format, vendor name, detail information and so on) of the target safety device 10.

Based on the status information of each safety device 10, the support apparatus 300 selects the safety device 10 to which the device identification information is to be newly set from one or a plurality of safety devices 10 from which the status information is obtained. The safety device 10 to which the device identification information is to be newly set may be displayed in a list form.

Finally, in accordance with an instruction from a user, the support apparatus 300 determines and sets corresponding device identification information for each of the safety device 10 that is selected based on the network identification information set for the network to which each safety device 10 belongs and the network address of each safety device 10.

By employing this configuration, the user can easily implement the setting of the device identification information required for the establishment of the connection between the control apparatus 2 and each safety device 10.

B. Configuration Example of Safety Control System

Figure 2:
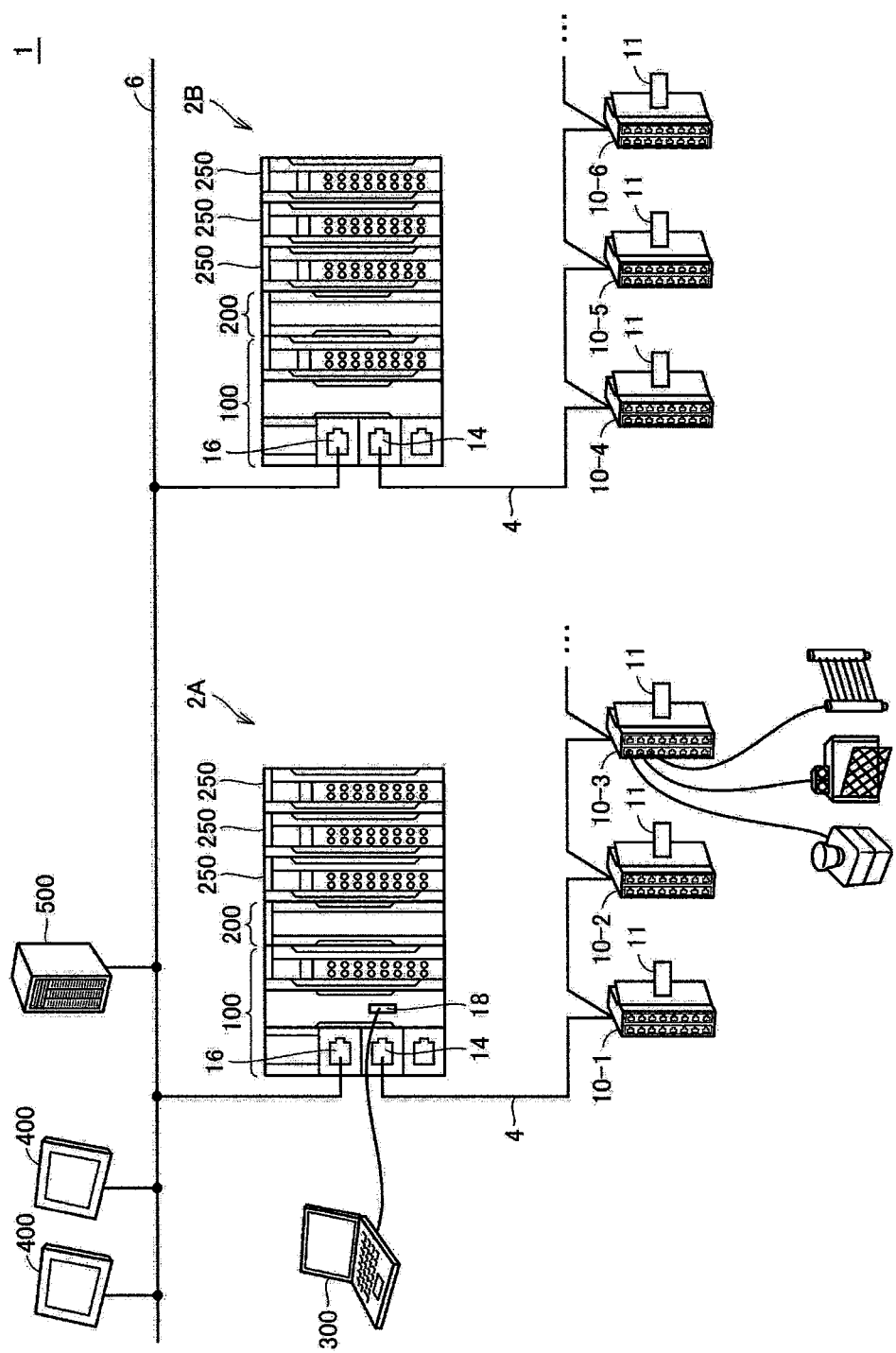
FIG. 2 is a schematic diagram showing a configuration example of the safety control system of this embodiment.

Next, a configuration example of the safety control system 1 of this embodiment is described. FIG. 2 is a schematic diagram showing a configuration example of the safety control system 1 of this embodiment.

In FIG. 2, the safety control system 1 including two control apparatuses 2A, 2B (also generally referred to as "the control apparatus 2" hereinafter) is shown as an example.

The control apparatus 2 is capable of standard control and safety control for controlling the control target that is not shown.

Although the standard control and the safety control may be achieved by the same unit, the control apparatus 2 is constituted of a standard control unit 100 that is mainly responsible for the control to the control target, and a safety control unit 200 that is mainly responsible for the safety control. As described later, by executing a standard control program in the standard control unit 100, the standard control is achieved, and by executing a safety program in the safety control unit 200, the safety control is achieved. One or a plurality of safety IO units 250 may be mounted on the control apparatus 2.

The safety IO unit 250 is responsible for input of signals from safety components and/or output of signals to the safety components. In this specification, the "safety component" mainly includes arbitrary apparatuses used in the safety control, for example, including a safety relay, all types of safety sensors and the like.

The standard control unit 100 is communicably connected to the safety control unit 200 and the safety IO unit 250 via an internal bus. In the control apparatus 2 shown in FIG. 2, in the standard control unit 100, communication ports 14, 16 for the connection with another control apparatus 2 or device are arranged, and the safety control unit 200 uses the standard control unit 100 that is connected via the internal bus to exchange data with another control apparatus 2 or device.

The standard control unit 100 includes the communication port 14 for physical connection with a subordinate network 4, and the communication port 16 for physical connection with a superordinate network 6. As an example, one or a plurality of the safety devices 10-1, 10-2, 10-3, 10-4, 10-5, 10-6 . . . is connected to the subordinate network 4, and one or a plurality of HMIs (Human Machine Interface) 400 and a server apparatus 500 are connected to the superordinate network 6. In addition, the control apparatus 2A and the control apparatus 2B are also connected via the superordinate network 6.

The HMI 400 displays state values and the like kept by the control apparatus 2 and receives user operation to output content of the user operation that is received to the control apparatus 2.

The server apparatus 500 contains a database that collects information from the control apparatus 2 or an operation management system and the like which give various settings such as a recipe to the control apparatus 2.

In FIG. 2, a safety IO device is shown as an example of the safety device 10. The safety IO device is one type of relay apparatus for forming a network for signals exchanged with one or a plurality of safety components (for example, an emergency stop button, a safety switch, light curtain and the like), which sends out detection signals and the like output from the safety component to the network and outputs instructions transmitted via the network to the target safety component. Moreover, the safety device is not limited to the safety IO device shown in FIG. 2, and any apparatus for achieving function safety can be used.

A protocol related to the data transmission of the subordinate network 4 and the superordinate network 6 may be an industrial network protocol such as EtherNet/IP, DeviceNet, CompoNet, ControlNet and the like. As described later, a program (application) executed in the standard control unit 100 and/or the safety control unit 200 employs such protocols related to the data transmission to achieve a data exchange in accordance with a communication protocol such as CIP (Common Industrial Protocol), CIP Safety or the like.

That is, the control apparatus 2 may employ an architecture in which the industrial network protocol such as EtherNet/IP, DeviceNet, CompoNet, ControlNet or the like is combined with the communication protocol (function at application level) such as CIP, CIP Safety or the like.

The description below mainly illustrates the architecture in which the CIP Safety is employed in addition to EtherNet/IP between the safety control unit 200 and one or a plurality of safety devices 10. Moreover, the CIP Safety is the communication protocol based on CIP and corresponding to function safety specifications such as IEC 61508 and the like.

Each of the safety device 10 has the memory part 11 for storing the information required for establishing the connection with the control apparatus 2. The memory part 11 keeps the device identification information that specifies each of the safety device 10. The memory part 11 is implemented using a flash memory, NVRAM (Non-Volatile RAM) or the like.

The support apparatus 300 is communicable with the control apparatus 2 via a communication port 18. That is, the support apparatus 300 is configured to be capable of communicating with the control apparatus 2 that is network-connected to one or a plurality of safety devices 10. The support apparatus 300 provides the user with functions such as development, debugging or the like of the program executed in the control apparatus 2 (the standard control unit 100 and/or the safety control unit 200), and provides the user with the function of performing network setting and the like to the safety device 10 which is connected via the subordinate network 4. The setting function provided by the support apparatus 300 is described later in detail.

C. Hardware Configuration Example

Next, hardware configuration examples of main apparatuses constituting the safety control system 1 of this embodiment are described.

c1: Standard Control Unit 100

Figure 3:
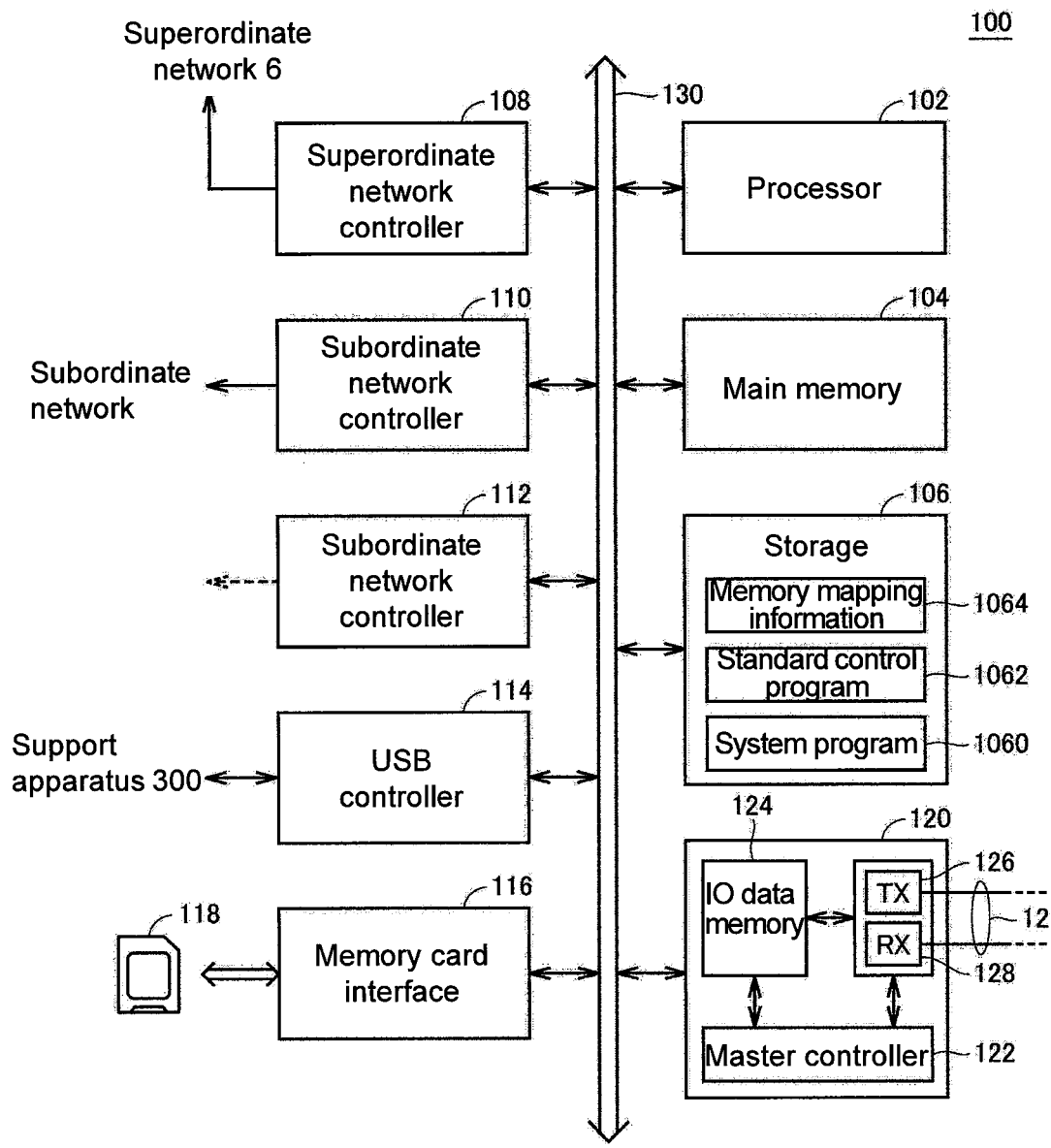
FIG. 3 is a schematic diagram showing a hardware configuration example of a standard control unit constituting a control apparatus of this embodiment.

FIG. 3 is a schematic diagram showing a hardware configuration example of the standard control unit 100 constituting the control apparatus 2 of this embodiment. Referring to FIG. 3, the standard control unit 100 includes a processor 102, a main memory 104, a storage 106, a superordinate network controller 108, subordinate network controllers 110, 112, a USB (Universal Serial Bus) controller 114, a memory card interface 116, and an internal bus controller 120. These components are connected via a processor bus 130.

The processor 102 corresponds to an operation processing part that implements a control operation and the like and is formed of a CPU (Central Processing Unit), a GPU (Graphics Processing Unit) or the like. Specifically, the processor 102 reads out programs (for example, a system program 1060 and a standard control program 1062) stored in the storage 106 and develops the programs in the main memory 104 for execution, thereby achieving the control corresponding to the control target and various processing as described later.

The main memory 104 is formed of a volatile memory apparatus and the like such as a DRAM (Dynamic Random Access Memory), a SRAM (Static Random Access Memory) and the like. The storage 106 is formed of a non-volatile memory apparatus and the like, for example, a HDD (Hard Disk Drive), a SSD (Solid State Drive) and the like.

In the storage 106, in addition to the system program 1060 for achieving the basic function, the standard control program 1062 which is created corresponding to the control target such as equipment or a machine is stored. Furthermore, in the storage 106, memory mapping information 1064 for relaying the data transmission which is done by the safety control unit 200 and employs the superordinate network controller 108 and/or the subordinate network controllers 110, 112 is stored.

The superordinate network controller 108 exchanges data with an arbitrary information processing apparatus such as another control apparatus 2, the HMI 400, the server apparatus 500 or the like via the superordinate network 6.

The subordinate network controllers 110, 112 exchanges data with the device and/or the safety device 10 via the subordinate network 4. In FIG. 3, two subordinate network controllers 110, 112 are shown, but it may also be that only one subordinate network controller is employed.

The USB controller 114 exchanges data with the support apparatus 300 and the like via a USB connection.

The memory card interface 116 receives a memory card 118 which is an example of detachable recording medium. The memory card interface 116 is capable of writing data into the memory card 118 and reading various data (log, trace data and so on) out from the memory card 118.

The internal bus controller 120 exchanges data with safety control unit 200 or the safety IO unit 250 via the internal bus 12. More specifically, the internal bus controller 120 includes a master controller 122, an IO data memory 124, a transmission circuit (TX) 126, and a reception circuit (RX) 128.

The IO data memory 124 is the memory which temporarily keeps data (input data and output data) exchanged with various units via the internal bus 12, and an address corresponding to each unit is specified in advance. The transmission circuit 126 generates a communication frame that includes the output data and sends out the communication frame to the internal bus 12. The reception circuit 128 receives the communication frame transmitted through the internal bus 12 and demodulates the communication frame into the input data. The master controller 122 controls the IO data memory 124, the transmission circuit 126, and the reception circuit 128 according to data transmission timing and the like on the internal bus 12. The master controller 122 provides the control as a communication master that manages the data transmission and the like on the internal bus 12.

In FIG. 3, the configuration example in which the necessary functions are provided by the processor 102 executing the programs is shown, but dedicated hardware circuit (for example, ASIC (Application Specific Integrated Circuit), FPGA (Field-Programmable Gate Array) or the like) may be used to implement part or all of the functions that are provided. Elsewise, hardware in accordance with a general-purpose architecture (for example, an industrial PC based on a general-purpose PC) may be used to implement main parts of the standard control unit 100. In this case, a virtualization technology may be used to execute a plurality of OSs (Operating System) with different purposes in parallel and execute necessary application in each OS. Furthermore, the configuration in which the functions of a display apparatus, a support apparatus or the like are integrated into the standard control unit 100 may be employed.

c2: Safety Control Unit 200

Figure 4:
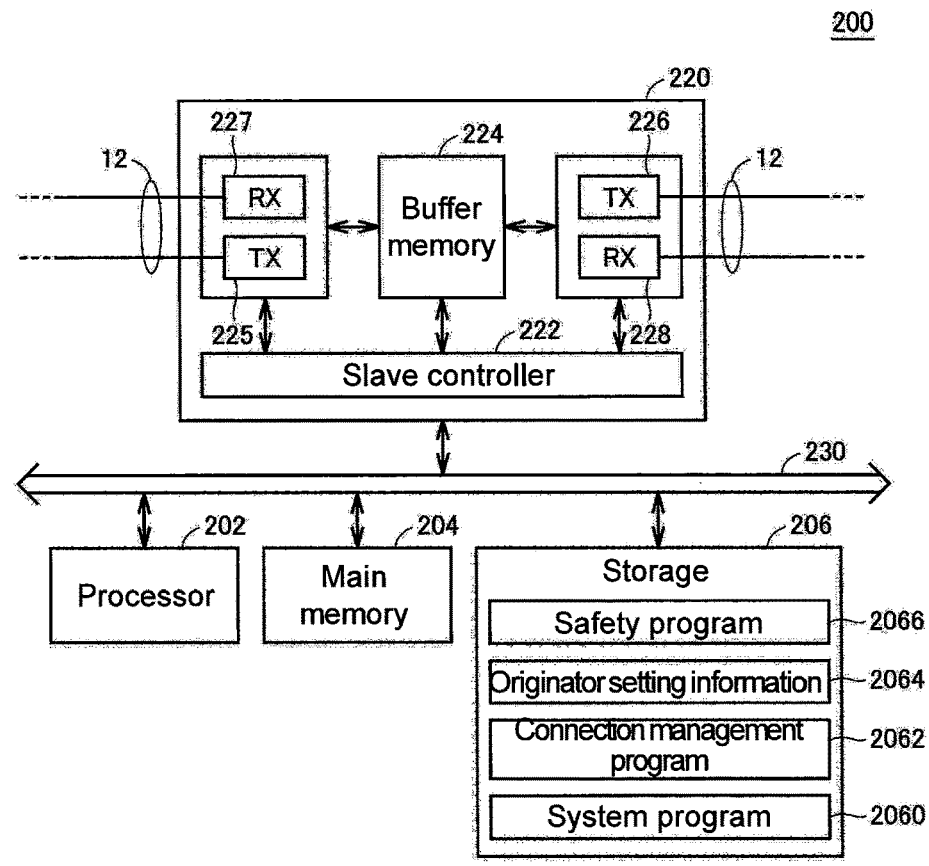
FIG. 4 is a schematic diagram showing a hardware configuration example of a safety control unit constituting the control apparatus of this embodiment.

FIG. 4 is a schematic diagram showing a hardware configuration example of the safety control unit 200 constituting the control apparatus 2 of this embodiment. Referring to FIG. 4, the safety control unit 200 includes a processor 202, a main memory 204, a storage 206, and an internal bus controller 220. These components are connected via a processor bus 230.

The internal bus controller 220 functions as a communication slave and provides a communication interface the same as other units. That is, the internal bus controller 220 exchanges data with the standard control unit 100 and the function units via the internal bus 12.

On the internal bus 12, the safety control unit 200 and the safety IO unit 250 are daisy-chain connected. That is, on receiving the communication frame from an apparatus existing on the upper-stream side on the internal bus 12, the internal bus controller 220 copies inside all or part of the data of the communication frame and delivers the data to an apparatus existing on the lower-stream side. Similarly, on receiving the communication frame from the apparatus existing on the lower-stream side on the internal bus 12, the internal bus controller 220 copies inside all or part of the data of the communication frame and delivers the data to the apparatus existing on the upper-stream side. The data transmission between the standard control unit 100 and the function units and the safety control unit 200 is achieved by this sequential delivery of the communication frame.

More specifically, the internal bus controller 220 includes a slave controller 222, a buffer memory 224, transmission circuits (TX) 225, 226, and reception circuits (RX) 227, 228.

The buffer memory 224 temporarily keeps the communication frame transmitted through the internal bus 12.

On receiving the communication frame transmitted through the internal bus 12, the reception circuit 227 stores all or part of the communication frame in the buffer memory 224. The transmission circuit 226 sends out the communication frame received by the reception circuit 227 to the internal bus 12 on the lower-stream side.

Similarly, on receiving the communication frame transmitted through the internal bus 12, the reception circuit 228 stores all or part of the communication frame in the buffer memory 224. The transmission circuit 225 sends out the communication frame received by the reception circuit 228 to the internal bus 12 on the lower-stream side.

The slave controller 222 controls the transmission circuits 225, 226, the reception circuits 227, 228, and the buffer memory 224 to achieve the sequential delivery of the communication frame on the internal bus 12.

The processor 202 corresponds to an operation processing part that implements a control operation and the like and is formed of a CPU, a GPU or the like. Specifically, the processor 202 reads out programs (for example, a system program 2060, a connection management program 2062, and a safety program 2066) stored in the storage 206 and develops the programs in the main memory 204 for execution, thereby achieving the control corresponding to the control target and various processings as described later.

The main memory 204 is formed of a volatile memory apparatus and the like such as a DRAM, a SRAM and the like. The storage 206 is formed of a non-volatile memory apparatus and the like, for example, a HDD, a SSD and the like.

In the storage 206, in addition to the system program 2060 for achieving the basic function, the connection management program 2062 for establishing and maintaining the connection used to exchange data with the safety device 10, originator setting information 2064 that contains setting information required for the data exchange with the safety device 10, and the safety program 2066 which is created corresponding to the target safety device 10 are stored.

In FIG. 4, the configuration example in which the necessary functions are provided by the processor 202 executing the programs is shown, but dedicated hardware circuit (for example, ASIC, FPGA or the like) may be used to implement part or all of the functions that are provided. Elsewise, hardware in accordance with a general-purpose architecture (for example, an industrial PC based on a general-purpose PC) may be used to implement main parts of the safety control unit 200.

c3: Support Apparatus 300

Figure 5:
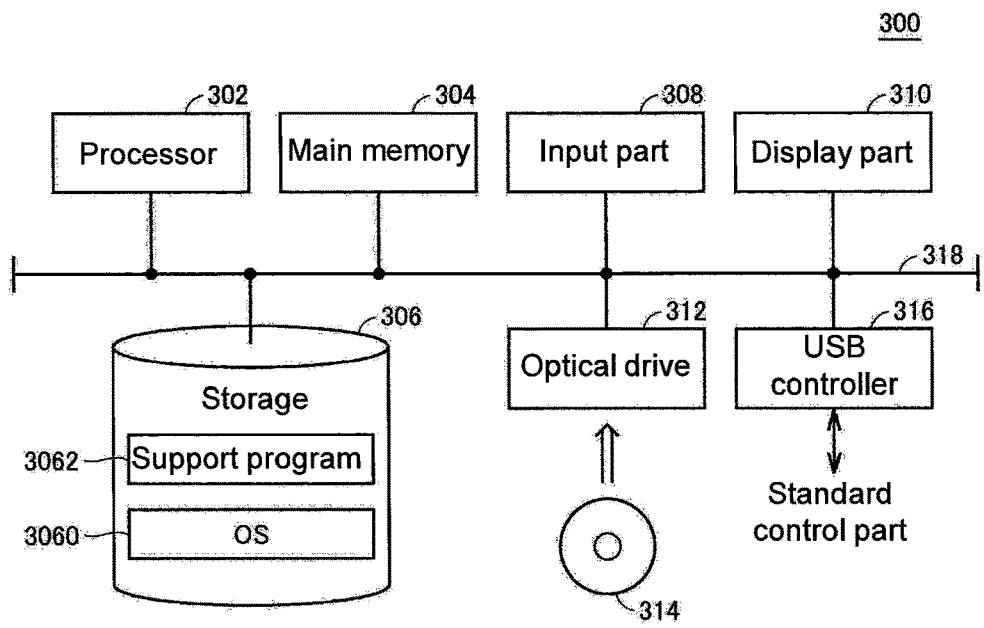
FIG. 5 is a schematic diagram showing a hardware configuration example of a support apparatus connected to the control apparatus of this embodiment.

FIG. 5 is a schematic diagram showing a hardware configuration example of the support apparatus 300 connected to the control apparatus 2 of this embodiment. As an example, the support apparatus 300 is achieved by using hardware in accordance with a general-purpose architecture (for example, a general-purpose PC) to execute the programs.

Referring to FIG. 5, the support apparatus 300 includes a processor 302, a main memory 304, a storage 306, an input part 308, a display part 310, an optical drive 312, and a USB controller 316. These components are connected via a processor bus 318.

The processor 302 is formed of a CPU and the like, reads out the programs (for example, an OS 3060 and a support program 3062) stored in the storage 306 and develops the programs in the main memory 304 for execution, thereby implementing various processings described later.

The main memory 304 is formed of a volatile memory apparatus or the like such as a DRAM, a SRAM or the like. The storage 306 is formed of, for example, a non-volatile memory apparatus or the like such as a HDD, a SSD or the like.

In the storage 306, in addition to the OS 3060 for achieving the basic functions, the support program 3062 for providing the function as the support apparatus 300 is stored.

The input part 308 is formed of a keyboard, a mouse or the like and receives user operations. The display part 310 is formed of a display, various indicators, a printer and so on and outputs processing results and the like from the processor 302.

The USB controller 316 controls, via USB connection, the data exchange with the standard control unit 100 and the like of the control apparatus 2.

The support apparatus 300 has an optical drive 312, and from a recording medium 314 (for example, an optical recording medium such as a DVD (Digital Versatile Disc) or the like) which stores computer-readable programs in a non-transitory manner, the programs stored therein are read out to be installed in the storage 306 and the like.

The programs executed in the support apparatus 300 may be installed via the computer-readable recording medium 314, or be installed in a form downloaded from the server apparatus and the like on the network. Besides, the functions provided by the support apparatus 300 of this embodiment may also be achieved in a form employing part of the module provided by the OS.

In FIG. 5, the configuration example is shown in which necessary functions as the support apparatus 300 are provided by the processor 302 executing the programs, but dedicated hardware circuits (for example, ASIC, FPGA or the like) may be used to implement part or all of the functions that are provided.

c4: Others

The safety IO unit 250 is an example of the function units that are connected to the standard control unit 100 via the internal bus 12, and performs the signal input from the safety device 10 and/or the signal output to the safety device 10. Compared with a standard IO unit, the safety IO unit 250 is installed with signal input-output and management function required for achieving the safety of feedback signals and so on. The hardware configuration of the safety IO unit 250 is publicly known, and thus more detailed description is not performed.

The HMI 400 may employ a hardware configuration mounted as a dedicated machine or employ a hardware configuration in accordance with a general-purpose architecture (for example, an industrial PC based on a general-purpose PC). When the HMI 400 is implemented by the industrial PC based on a general-purpose PC, the hardware configuration similar to the support apparatus 300 as shown in the aforementioned FIG. 5 is employed. However, an application program for achieving HMI processing is installed instead of the support program 3062 in the configuration example shown in FIG. 5.

As an example, the server apparatus 500 can be achieved using a general-purpose file server or database server. The hardware configuration of such an apparatus is publicly known, and thus more detailed description is not performed.

D. Communication Between Safety Control Unit 200 and Safety Device 10

Next, the communication between the safety control unit 200 and the safety device 10 is described.

Figure 6:
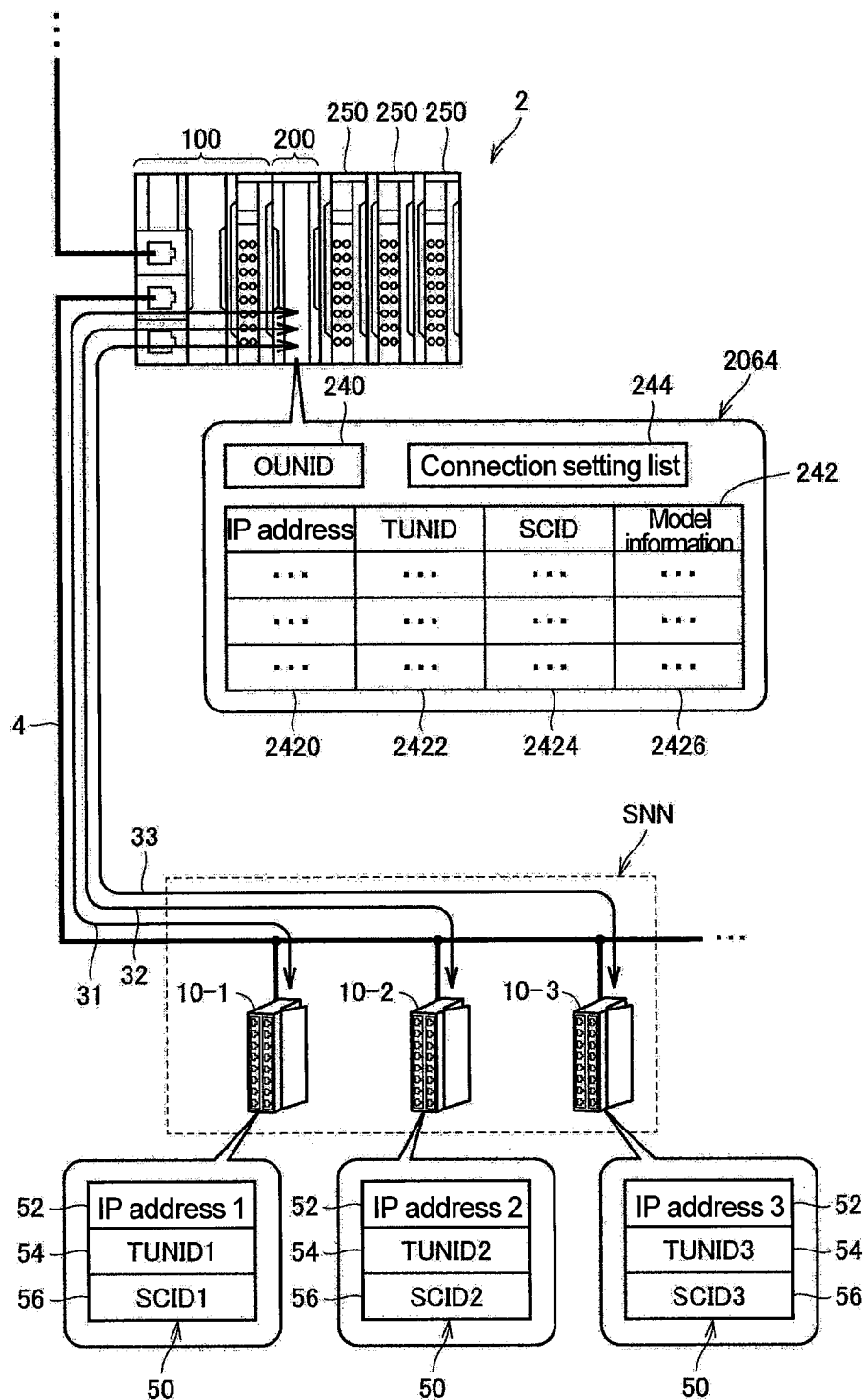
FIG. 6 is a schematic diagram for describing data transmission between the safety control unit and a safety device in the safety control system of this embodiment.

FIG. 6 is a schematic diagram for describing the data transmission between the safety control unit 200 and the safety device in the safety control system 1 of this embodiment. Referring to FIG. 6, when obtaining the input data from the safety device 10-1, 10-2, 10-3 . . . , or giving arbitrary output to the safety device 10-1, 10-2, 10-3 . . . , the safety control unit 200 performs one type of message transmission communication with each safety device 10-1, 10-2, 10-3 . . . .

As shown in FIG. 6, a connection 31 for performing the message transmission between the safety control unit 200 and the safety device 10-1, a connection 32 for performing the message transmission between the safety control unit 200 and the safety device 10-2, and a connection 33 for performing the message transmission between the safety control unit 200 and the safety device 10-3 are respectively established.

In the description below, the safety control unit 200 that functions as the communication master is also referred to as an "originator", and the safety device 10 that functions as the communication slave is also referred to as a "target".

In this kind of message transmission, identification information such as an IP address, a SNN (Safety Network Number), an OUNID (Originator Unit Number Identifier), a TUNID (Target Number Identifier), a SCID (Safety Configuration Identifier) and the like are used in the connection establishment and message exchange.

The IP address is a network address allocated to the safety control unit 200 (the control apparatus 2) and each device. The IP address is set so as not to repeat in the same network.

The SNN is an example of the network identification information, and is the identification information set in a range in which the safety control unit 200 is handled as a single network. The SNN is set so as not to mutually repeat in each network in the safety control system 1. Moreover, in the SNN, values defined by hexadecimal numbers may be set. However, in the following, for convenience of description, an example is shown in which values defined by numbers and characters are set. In FIG. 6, an example is shown in which the SNN is set for the network including the safety device 10-1, 10-2, 10-3.

The OUNID is the identification information for specifying the safety control unit 200 that is the originator.

The TUNID is the identification information for specifying each safety device that is the target. Typically, a data string in which the SNN of the network to which each target device belongs and the IP address of each target device are combined is used as the TUNID. In this way, the TUNID which the device identification information may be determined based on the IP address of the target safety device 10 and the SNN which is the network identification information set for the network to which the target safety device 10 belongs.

The SCID is the identification information allocated when necessary setting is performed on each safety device (target), and is used to ensure that the setting kept on an originator side is the same as the setting kept on in the target.

More specifically, each of the safety devices 10-1, 10-2, 10-3 . . . that is the target has target setting information 50. The target setting information 50 includes an IP address 52, a TUNID 54, and a SCID 56.

On the other hand, the safety control unit 200 which is the originator has originator setting information 2064 for performing communication with each safety device. The originator setting information 2064 includes, in addition to an OUNID 240 that is the identification information of the safety control unit 200, a target setting list 242 and a connection setting list 244 related to each safety device.

The target setting list 242 consists of the identification information of each safety device and includes an IP address 2420, a TUNID 2422, a SCID 2424, and model information 2426 related to each safety device.

The connection setting list 244 defines for each network the IP address which is the network address of the safety device 10 belonging to this network. Detail of the connection setting list 244 is described later.

Figure 7:
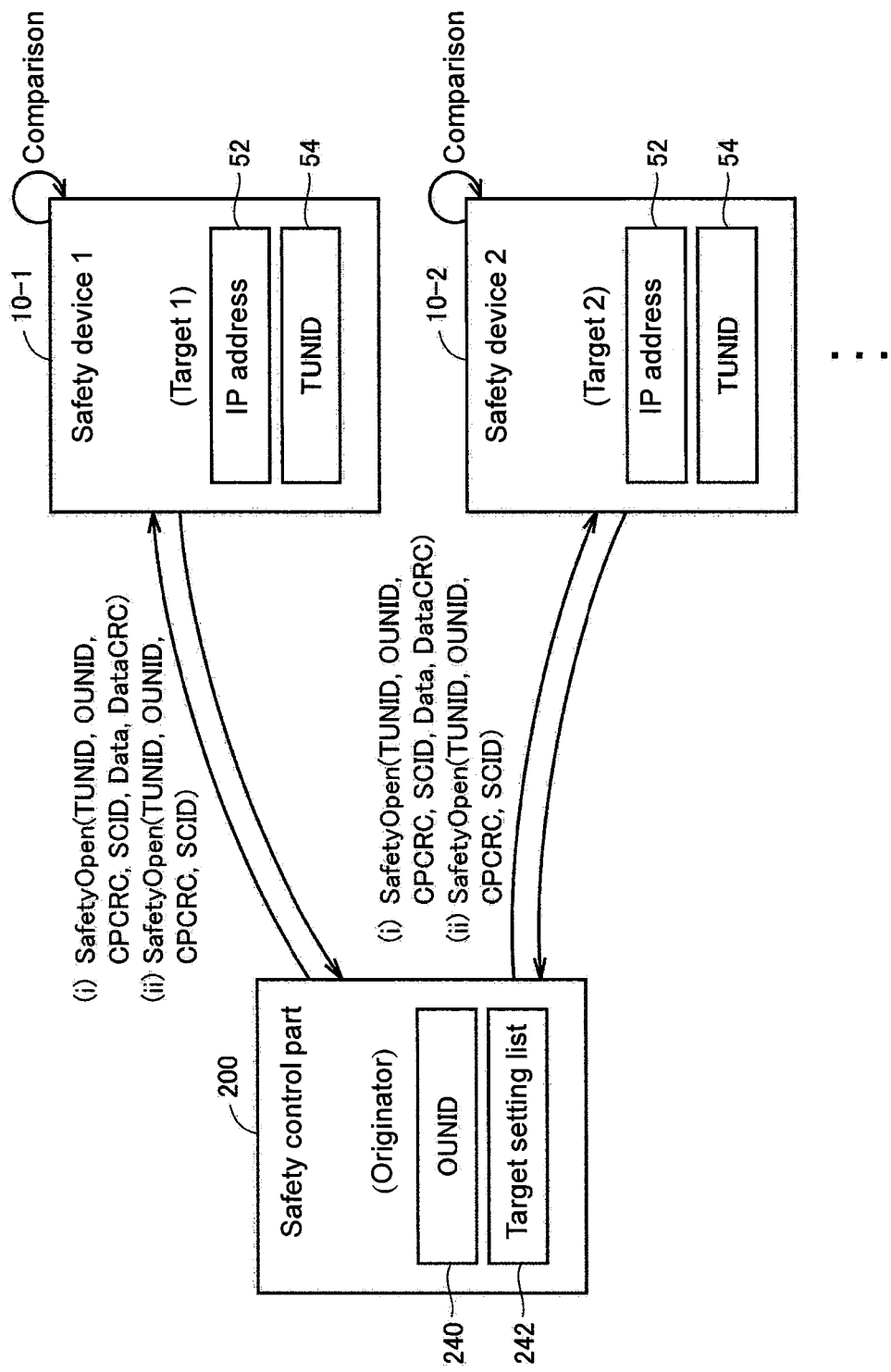
FIG. 7 is a schematic diagram showing an example of messages exchanged between the safety control unit and the safety device in the safety control system of this embodiment.

FIG. 7 is a schematic diagram showing an example of the message exchanged between the safety control unit 200 and the safety device in the safety control system 1 of this embodiment.

Referring to FIG. 7, for example, when the safety control unit 200 that is the originator establishes a connection with each safety device 10, a message including a command such as "Safety Open" is transmitted. A data format of the message includes the TUNID allocated to the target safety device, a CPCRC (Configuration Portion Cyclic Redundancy Check) for checking errors that may occur in the OUNID, the TUNID and the OUNID of the originator, the SCID allocated to the target safety device, entity data (Data), and a DataCRC (Data Cyclic Redundancy Check) for checking the errors that may occur in the entity data (a case of message (i)).

Elsewise, when there is no entity data to be transmitted, a simplified data format of the message may be employed. This data format includes the TUNID allocated to the target safety device, the OUNID of the originator, the CPCRC for checking the errors that may occur in the TUNID and the OUNID, and the SCID allocated to the target safety device (a case of message (ii)).

As for the TUNID and the SCID included in the data format shown in FIG. 7, the values kept by the safety control unit 200 that is the originator (that is, the TUNID 2422 and the SCID 2424 included in the target setting list 242 shown in FIG. 6) are used. Also for the OUNID, the values kept by the safety control unit 200 that is the originator (that is, the OUNID 240 shown in FIG. 6) are used.

On receiving the message (i) or (ii) from the safety control unit 200, each safety device 10 compares the message respectively with the TUNID 54 and the SCID 56 of the target setting information 50 kept by the device itself. Then, when the TUNID and the SCID in the message match with the TUNID 54 and the SCID 56 in the target setting information 50 respectively, a judgment is made that the message to the device itself is correctly received, and the processing designated by the command included in the received message is implemented.

Moreover, although it is not illustrated, the data format of the message in which the SCID is omitted may also be employed. In this case, the comparison of the TUNID included in the message and the TUNID 54 in the target setting information 50 becomes a main verification processing.

As described above, in the safety control system 1 of this embodiment, the originator (the safety control unit 200) is required to keep at least the TUNID which is the same as the TUNID set for the target (the safety device 10).

E. Setting of TUNID to Target

Next, the setting of the TUNID to the safety device 10 which is the target is described.

As described above, the originator (the safety control unit 200) and the target (the safety device 10) are required to keep the same TUNID. On the other hand, because the TUNID is determined depending on the SNN which is the identification information of the network to which each target belongs, in a case that a target is newly added to the network or the network which is a connection destination is altered, the TUNID is required to be set to the target from outside.

Figure 8A:
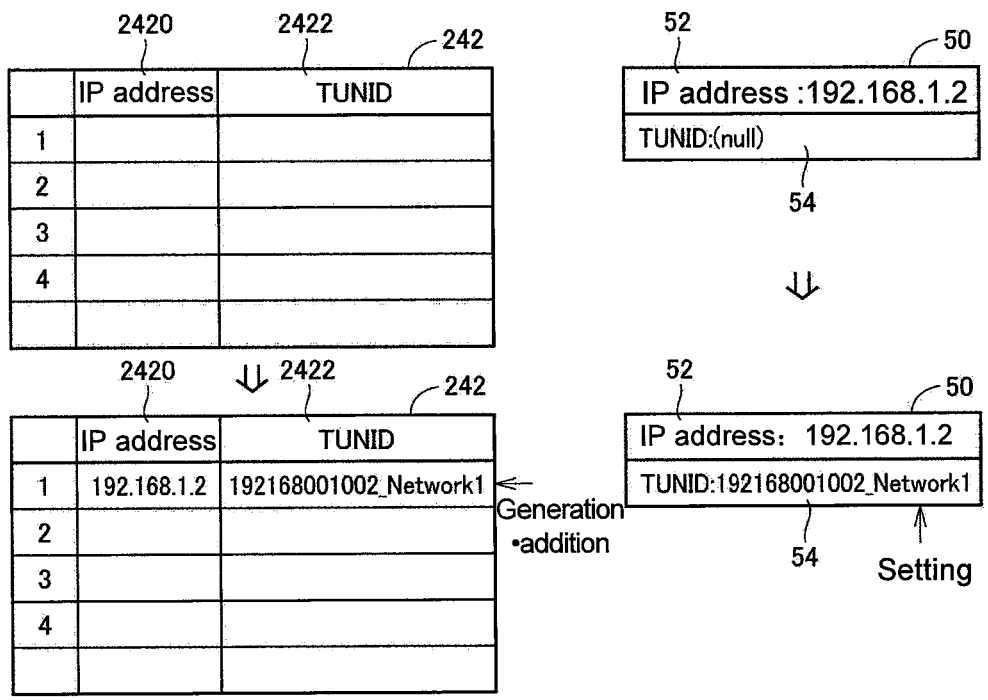
FIGS. 8A and 8B are schematic diagrams for describing a setting of TUNID in the safety control system of this embodiment.
Figure 8B:
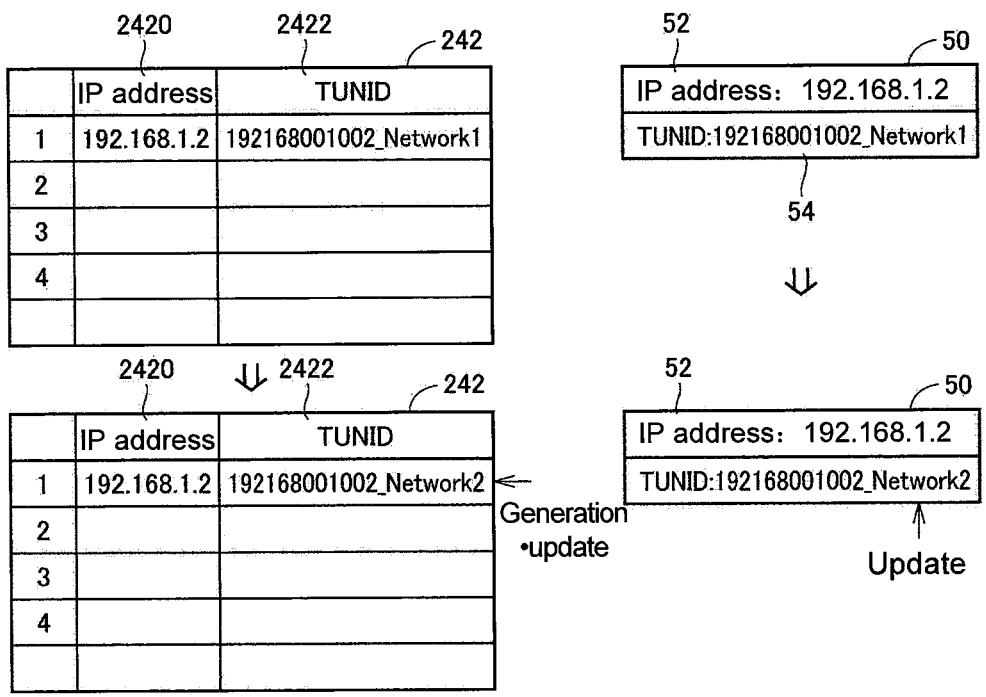

FIGS. 8A and 8B are schematic diagrams for describing the setting of the TUNID in the safety control system 1 of this embodiment. In FIG. 8A, a case is shown in which a target is newly connected to the network, and in FIG. 8B a case is shown in which the network which is the connection destination of the target is altered. Moreover, the SNN which is the identification information of the network is set in advance.

Referring to FIG. 8A, in an initial state, no setting is registered in the target setting list 242 of the originator, and only the IP address 52 is set in the target setting information 50 of the target.

In this state, the originator obtains the IP address of the target to generate the TUNID to the target. For example, when the IP address of the target is "192.168.1.2" and the SNN of the network which is the connection destination is "Network1", the TUNID is determined as "192168001002_Network1".

Then, the originator designates the IP address and transmits the generated TUNID. Hereupon, the target having the designated IP address sets the received TUNID as the TUNID 54 of the target setting information 50.

Besides, the target adds the IP address and the TUNID related to the target which is a transmission destination as the IP address 2420 and the TUNID 2422 of the target setting list 242.

According to this kind of processing, the same TUNID is set in the target setting list 242 of the originator and the target setting information 50 of the target.

In FIG. 8B, an example is shown in which the connection destination of the SNN is altered from the network of "Network1" to the network of "Network2". Immediately after the network which is the connection destination is altered, "192168001002_Network1" that is the TUNID before the alteration is set in the target setting list 242 of the originator. Similarly, "192168001002_Network1" that is the TUNID before the alteration is also set in the target setting information 50 of the target.

In this state, the originator confirms the IP address of the target to generate the TUNID to the target. In this example, the new TUNID is determined as "192168001002_Network2". Then, the originator designates the IP address and transmits the generated TUNID. Hereupon, the target having the designated IP address updates the received TUNID as the new TUNID 54 of the target setting information 50.

Besides, the target updates the value of the TUNID 2422 of the target setting list 242 to the value of the TUNID transmitted to the target.

According to this kind of processing, the same TUNID is set in the target setting list 242 of the originator and the target setting information 50 of the target.

Moreover, the originator can refer to a connection setting list that is prepared in advance to obtain the IP address of the target belonging to each network.

FIG. 9 is a schematic diagram showing an example of the connection setting list 244 in the safety control system 1 of this embodiment. Referring to FIG. 9, the connection setting list 244 is associated with each network to which the SNN is given and the IP address of the target belonging to each network is associated with the connection setting list 244.

The originator can specify the IP address of the target belonging to each network by referring to the connection setting list 244. Typically, the connection setting list 244 is generated by being set in advance by the user.

F. Setting Form of TUNID to Target

Next, a setting form of the TUNID to the safety device 10 that is the target is described. The aforementioned setting of the TUNID is implemented using the support apparatus 300 connected to the control apparatus 2. That is, in the setting of the TUNID, the support apparatus 300, the safety control unit 200 and the safety device 10 are related. Division of functions among these apparatuses may be arbitrarily designed, and three typical forms are illustrated in the following.

FIGS. 10A to 10C are schematic diagrams for describing setting forms of the TUNID in the safety control system 1 of this embodiment.

In FIG. 10A, an example is shown in which the support apparatus 300 generates or obtains the TUNID to the safety device 10 that is the target and routing information to the safety device 10.

More specifically, referring to FIG. 10A, the support apparatus 300 generates or obtains the TUNID to the safety device 10 that is the setting target (A1), and generates or obtains the routing information from the safety control unit 200 to the safety device 10 that is a setting destination of the TUNID (A2).

The routing information is information showing a route to the safety device 10 that is the destination. In a case or the like in which the network is hierarchical, it is necessary to relay a router or the like to arrive at the destination, and the routing information includes the information to designate such a router or the like that is to be relayed.

In the form shown in FIG. 10A, the support apparatus 300 has a routing function and generates the routing information from the safety control unit 200 to the safety device 10 that is the setting target based on the IP address of the safety device 10 that becomes the setting target of the TUNID.

Then, the TUNID and the routing information are given from the support apparatus 300 to the safety control unit 200 (A3).

The safety control unit 200 transmits the TUNID to the safety device 10 that is the destination in accordance with the routing information from the support apparatus 300 (A4). The safety device 10 set the TUNID from the safety control unit 200 to the target setting information 50.

As shown in FIG. 10A, the support apparatus 300 obtains the routing information showing the route from the control apparatus 2 (the safety control unit 200) to the target safety device 10 and transmits the TUNID (device identification information) that is determined to the control apparatus 2 (the safety control unit 200). Then, the control apparatus 2 (the safety control unit 200) may transmits the TUNID to a target safety device 20 based on the routing information from the support apparatus 300.

In FIG. 10B, an example is shown in which the support apparatus 300 generates or obtains the TUNID to the safety device 10 that is the target, and the safety control unit 200 performs the routing to the safety device 10 that is the destination.

More specifically, referring to FIG. 10B, the support apparatus 300 generates or obtains the TUNID to the safety device 10 that is the setting target (B1), and gives the TUNID to the safety control unit 200 along with the IP address of the safety device 10 that is the setting target (B2).

The safety control unit 200 generates or obtains the routing information to the destination based on the IP address of the safety device 10 that is the setting target from the support apparatus 300 (B3). That is, the safety control unit 200 has the routing function, and the routing information from the safety control unit 200 to the safety device 10 that is the setting target is generated based on the IP address of the safety device 10 that becomes the setting target of the TUNID.

Then, the safety control unit 200 transmits the TUNID to the safety device 10 that is the destination in accordance with the generated routing information (B4). The safety device 10 sets the TUNID from the safety control unit 200 to the target setting information 50.

As shown in FIG. 10B, the support apparatus 300 transmits the TUNID (device identification information) that is determined to the control apparatus 2 (the safety control unit 200) along with the IP address (network address) of the target safety device 10. Then, the control apparatus 2 (the safety control unit 200) may determine the route to the target safety device 10 based on the IP address from the support apparatus 300 and transmits the TUNID to the target safety device 10.

In FIG. 10C, an example is shown in which the support apparatus 300 generates or obtains the TUNID to the safety device 10 that is the target and also performs the routing to the safety device 10 that is the destination. In this form, the safety control unit 200 actually exhibits the function of data relay only.

More specifically, referring to FIG. 10C, the support apparatus 300 generates or obtains the TUNID to the safety device 10 that is the setting target (C1). Then, the support apparatus 300 generates or obtains the routing information to the destination based on the IP address of the safety device 10 that is the setting target (C2). That is, the support apparatus 300 has the routing function, and relays the safety control unit 200 from the support apparatus 300 to generate the routing information reaching the safety device 10 that is the setting target based on the IP address of the safety device 10 that becomes the setting target of the TUNID.

Then, the support apparatus 300 transmits the TUNID to the safety device 10 that is the destination in accordance with the generated routing information (C3). The safety device 10 sets the TUNID from the safety control unit 200 to the target setting information 50.

As shown in FIG. 10C, the support apparatus 300 may determine the route to the target safety device 10 and transmits the TUNID (device identification information) to the target safety device 10.

As described above, in the processing of setting the TUNID for the safety device 10, the division of functions between the support apparatus 300 and the safety control unit 200 can be determined arbitrarily.

In the description above, the configuration in which the support apparatus 300 generates the TUNID is mainly described, but the present disclosure is not limited hereto. For example, the TUNID may be obtained regardless of the server apparatus and the like which manage the setting.

G. Setting Procedures of TUNID in Support Apparatus 300

Next, setting procedures of the TUNID in the support apparatus 300 is described. As for the basic setting processing of the TUNID, first, (1) when the TUNID is not set to the target safety device 10, the TUNID generated or obtained by the support apparatus 300 is set. On the other hand, (2) when the TUNID is already set to the target safety device 10, the processing of (2-1) updating the TUNID of a target belonging to the same network as the aforementioned target prior to the SNN defined in the TUNID that is already set, or (2-2) updating the TUNID of the aforementioned target prior to the SNN of the network that is already set is implemented.

In the safety control system 1 of this embodiment, the support apparatus 300 is used to set the TUNID for the target safety device 10. In the following, the processing procedures related to the setting of the TUNID in the support apparatus 300 are described.

Figure 11:
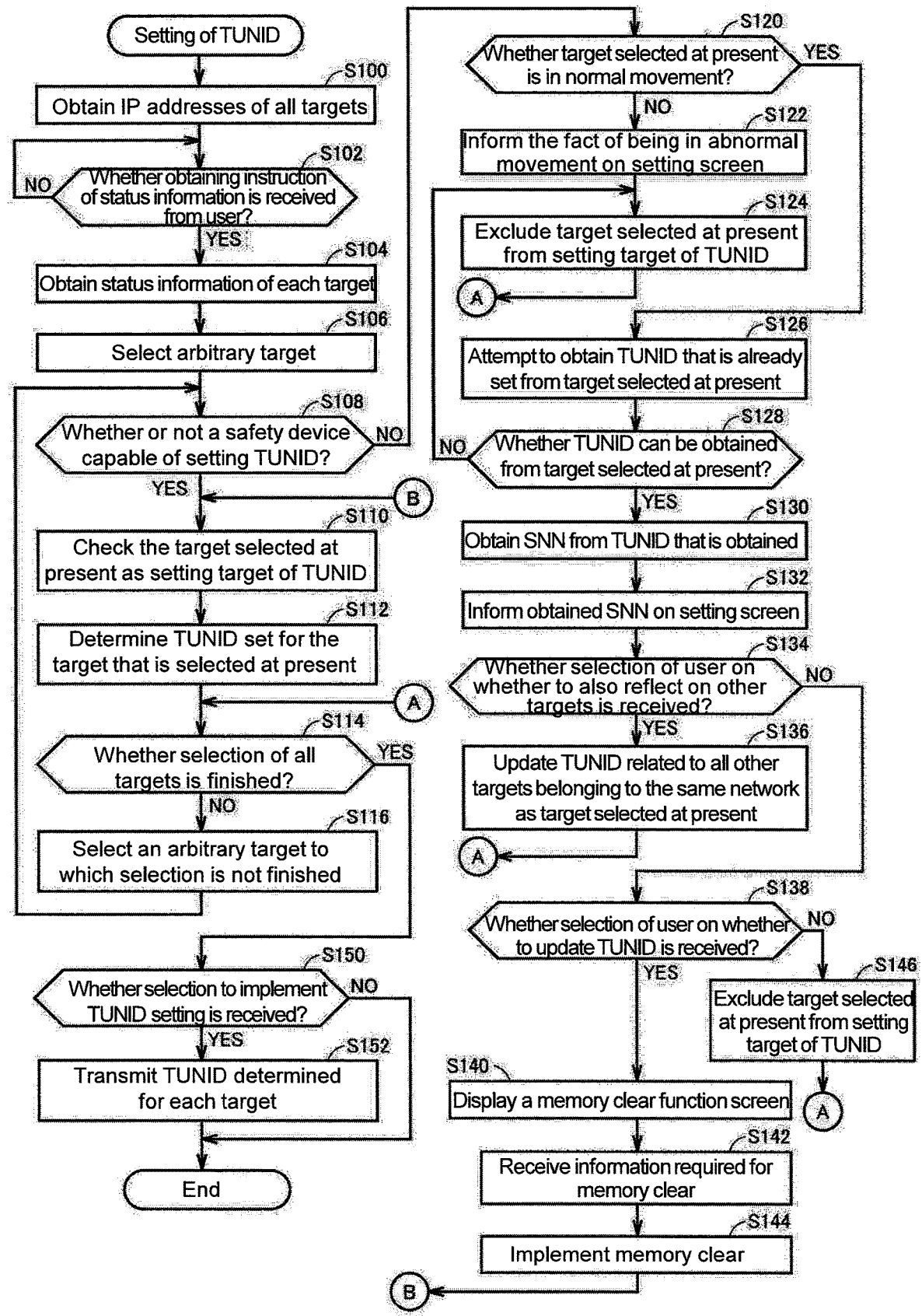
FIG. 11 is a flowchart showing processing procedures of the setting of the TUNID in the safety control system of this embodiment.

FIG. 11 is a flowchart showing the processing procedures related to the setting of the TUNID in the safety control system 1 of this embodiment. Each step shown in FIG. 11 is implemented by the processor 302 of the support apparatus 300 executing the support program 3062.

Figure 12:
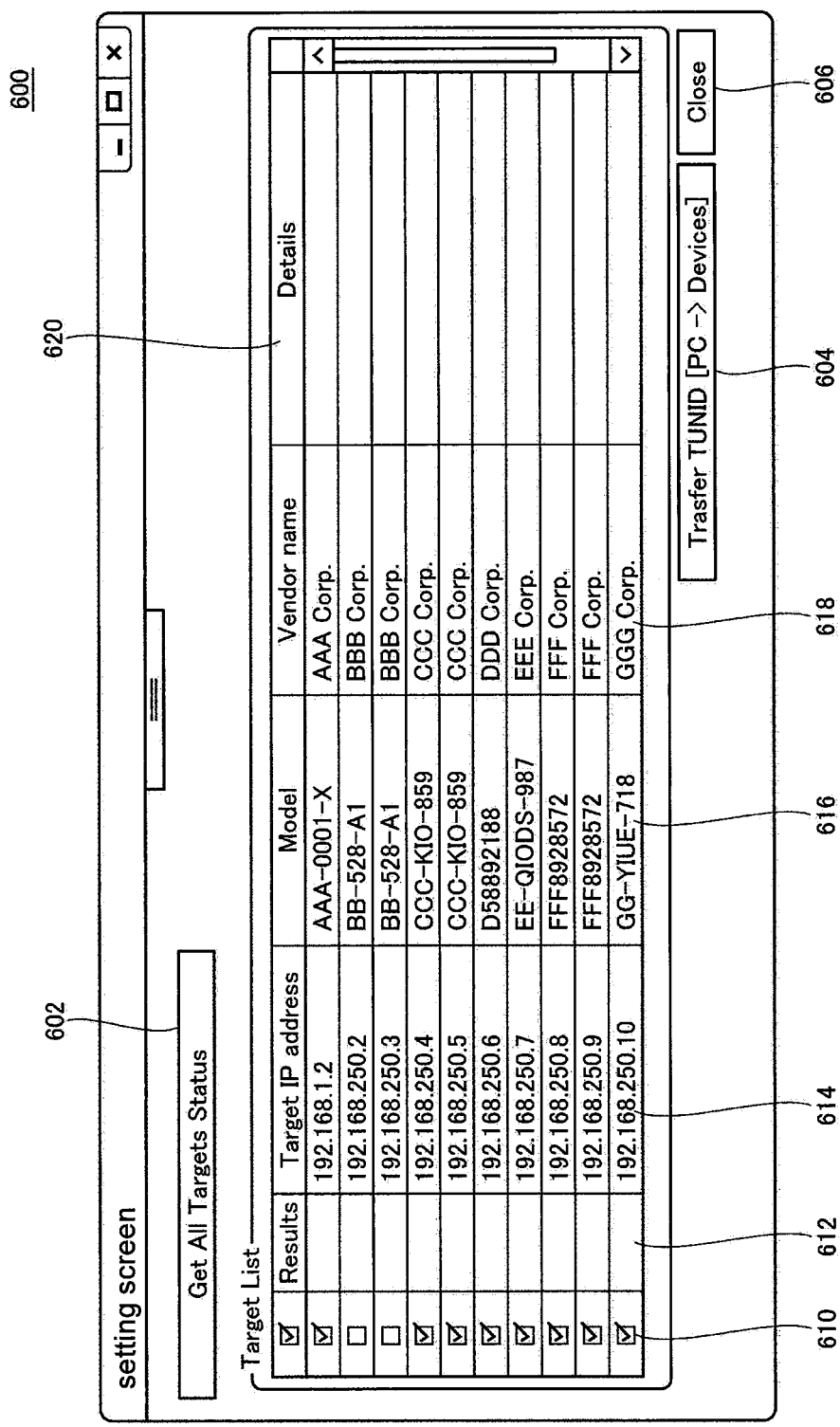
FIG. 12 is a schematic diagram showing an example of a setting screen in the setting of the TUNID in the safety control system of this embodiment.

FIG. 12 is a schematic diagram showing an example of a setting screen 600 related to the setting of the TUNID in the safety control system 1 of this embodiment. The setting screen 600 shown in FIG. 12 is presented on a display part 310 of the support apparatus 300.

Referring to FIG. 11, the support apparatus 300 obtains the IP addresses of all the targets that are set with reference to the connection setting list 244 (step S100). When an obtaining instruction of the status information is received from the user ("YES" in step S102), the support apparatus 300 obtains the status information of each target based on the IP address obtained in step S100 (step S104). When the obtaining instruction of the status information is not received from the user ("NO" in step S102), the processing of step S102 is repeated.

Accordingly, in steps S100 and S104, the support apparatus 300 refers, in each network, to the connection setting list 244 that defines the network address of the safety device 10 belonging to this network, and obtains the status information respectively from one or a plurality of the safety device 10 network-connected to the control apparatus 2. This processing corresponds to a status information obtaining function of the support apparatus 300.

As a specific example, the setting screen 600 shown in FIG. 12 has a status information obtaining button 602, and the status information obtaining instruction is given to the support apparatus 300 by the user selecting the status information obtaining button 602.

The status information of each target includes, in addition to the movement state, various attribute information (format, vendor name, detailed information and so on). In the setting screen 600 shown in FIG. 12, in addition to an IP address 614 of each target, a model (Model) 616, a vendor name (Vendor name) 618, and detailed information (Details) 620 are displayed as the status information that is obtained.

Then, a judgment is made, in accordance with the procedures as follows, for each target to which the status information is obtained on whether the target becomes the setting target of the TUNID.

Specifically, the support apparatus 300 selects an arbitrary target to which the status information is obtained (step S106). Then, the support apparatus 300 judges whether the target that is selected at present is the safety device capable of setting the TUNID (step S108). That is, a judgment is made on whether any TUNID is already set for the target that is selected at present.

When the target selected at present is the safety device capable of setting the TUNID ("YES" in step S108), the support apparatus 300 checks the target selected at present as the setting target of the TUNID (step S110).

In the setting screen 600 shown in FIG. 12, a checkbox 610 is arranged in association with each target, and the corresponding checkbox 610 is checked. Moreover, the checkbox 610 of the setting screen 600 can be arbitrarily checked or unchecked by the user. That is, the support apparatus 300 may be capable of receiving from the user an arbitrary selection of the safety device 10 to which the TUNID (device identification information) is to be newly set from one or a plurality of safety devices 10 to which the status information is obtained.

Besides, the support apparatus 300 determines the TUNID set for the target that is selected at present based on the IP address of the target selected at present and the SNN of the network to which the target selected at present belongs (step S112).

Then, the support apparatus 300 judges whether the selection of all the targets to which the status information is obtained is finished (step S114).

When the selection of the targets to which the status information is obtained is not finished ("NO" in step S114), the support apparatus 300 selects an arbitrary target to which the selection is not finished (step S116) and repeats the processing after step S108.

On the other hand, when the selection of all the targets to which the status information is obtained is finished ("YES" in step S114), the processing after step S150 is implemented.

Besides, when the target selected at present is the safety device incapable of setting the TUNID ("NO" in step S108), the support apparatus 300 judges whether the target selected at present is in a normal movement (step S120).

When the target selected at present is not in the normal movement ("NO" in step S120), the support apparatus 300 informs the fact that the target selected at present is in an abnormal movement on the setting screen (step S122), and excludes the target selected at present from the setting target of the TUNID (step S124). Then, the processing of step S114 is implemented.

When the target selected at present is in the normal movement ("YES" in step S120), the support apparatus 300 attempts to obtain the TUNID that is already set from the target selected at present (step S126). Then, the support apparatus 300 judges whether the TUNID that is already set can be obtained from the target selected at present (step S128).

When the TUNID that is already set cannot be obtained from the target selected at present ("NO" in step S128), the support apparatus 300 excludes the target selected at present from the setting target of the TUNID (step S124). Then, the processing of step S114 is implemented.

When the TUNID that is already set can be obtained from the target selected at present ("YES" in step S128), the support apparatus 300 obtains the SNN from the TUNID that is obtained (step S130) and informs the obtained SNN on the setting screen (step S132). Then, the support apparatus 300 receives the selection of the user on whether to also reflect the obtained SNN on other targets belonging to the same network (step S134).

When the selection that the obtained SNN is also reflected on other targets belonging to the same network is received ("YES" in step S134), the support apparatus 300 updates the TUNID related to all other targets belonging to the same network as the target selected at present (step S136). Then, the processing of step S114 is implemented.

In this way, the support apparatus 300 may obtain, from the TUNID (device identification information) already set to any of the safety device 10, the SNN (network identification information) of the network to which this safety device 10 belongs, and determine the TUNID to other safety devices 10 belonging to the same network as this safety device 10 based on the obtained SNN.

When the selection that the obtained SNN is not reflected on other targets belonging to the same network is received ("NO" in step S134), the support apparatus 300 receives the selection of the user on whether to update the TUNID of the target selected at present (step S138).

When the selection to update the TUNID of the target selected at present is received ("YES" in step S138), the support apparatus 300 displays a memory clear function screen to the target selected at present (step S140). Then, the support apparatus 300 receives the information required for memory clear via the memory clear function screen (step S142). Then, the support apparatus 300 implements the memory clear to the target selected at present in accordance with the information input in step S142 (step S144). Then, the processing after step S110 is implemented.

Accordingly, corresponding TUNID (device identification information) may be set after the TUNID (device identification information) already set for the target safety device 10 is temporarily cleared. Moreover, when the configuration is employed in which the original TUNID is automatically memory cleared when the TUNID is newly set, the memory clear may not be implemented explicitly.

When the selection not to update the TUNID of the target selected at present is received ("NO" in step S138), the support apparatus 300 excludes the target selected at present from the setting target of the TUNID (step S146). Then, the processing of step S114 is implemented.

Accordingly, in steps S108, S110, S120-S134, S138, S146, the support apparatus 300 selects, based on the status information of each safety device 10, the safety device to which the TUNID (device identification information) is to be newly set among one or a plurality of safety devices 10 to which the status information is obtained. This processing corresponds to a safety device selection function of the support apparatus 300.

In step S150, the support apparatus 300 judges whether the user selection on whether to implement the TUNID setting is received (step S150). As a specific example, the setting screen 600 shown in FIG. 12 has a TUNID setting button 604, and the instruction to implement the TUNID setting is given to the support apparatus 300 by the user selecting the TUNID setting button 604.

When the user selection to implement the TUNID setting is received ("YES" in step S150), the support apparatus 300 transmits the TUNID determined for each target to each target that is checked as the setting target of the TUNID (step S152). Accordingly, in steps S112, S136, S150, S152, the support apparatus 300 determines and sets corresponding TUNID (device identification information) for each of the selected safety device 10 in accordance with the instruction from the user based on the SNN (network identification information) set for the network to which each safety device 10 belongs and the IP address (network address) of each safety device 10. This processing corresponds to a device identification information setting function of the support apparatus 300.

Setting results of the TUNID may be reflected in result 612 of the setting screen 600 shown in FIG. 12. Then, the processing is ended.

When the user selection not to implement the TUNID setting is received ("NO" in step S150), the processing is ended directly. That is, the setting screen 600 shown in FIG. 12 has a close button 606, and a series of processing is ended by the user selecting the close button 606.

H. Variation

In the safety control system 1 shown in FIG. 2, the control apparatus 2 and the support apparatus 300 are mutually independent configurations, but all or part of the functions of the support apparatus 300 may be incorporated into the control apparatus 2. For example, by installing the support program 3062 that is installed in the support apparatus 300 in the control apparatus 2, the processing such as the setting of the TUNID can be implemented more easily.

In the description above, the control apparatus 2 in which the standard control unit 100 and the safety control unit 200 are combined is mainly illustrated. However, the present disclosure is not limited hereto and it is evident that the technical ideas of the disclosure of this application are also applicable to the control apparatus in which a plurality of standard control units 100 is combined and the control apparatus in which a plurality of safety control units 200 is combined. Furthermore, the present disclosure is not limited to the standard control unit and the safety control unit and may be the combination of arbitrary control units.

I. Appendix

The embodiment as described above includes the following technical ideas.

Configuration 1

A support apparatus (300) capable of communicating with a control apparatus (2; 200) network-connected to one or a plurality of safety devices (10), wherein each of the safety devices has a memory part (11) for keeping device identification information (54) that specifies the device itself, and the support apparatus includes:

an obtaining part (S100, S104), which refers, in each network, to a connection setting list (244) that defines a network address of a safety device belonging to the network, and obtains status information respectively from the one or a plurality of safety devices network-connected to the control apparatus;

a selecting part (S108, S110, S120-S134, S138, S146), which selects, based on the status information of each safety device, the safety device to which the device identification information is to be newly set among the one or a plurality of safety devices to which the status information is obtained; and a setting part (S112, S136, S150, S152), which determines and sets corresponding device identification information for each of the selected safety devices in accordance with an instruction from a user based on network identification information set for the network to which each safety device belongs and a network address of each safety device.

Configuration 2

The support apparatus according to configuration 1, wherein the setting part obtains routing information that shows a route from the control apparatus to a target safety device and transmits the determined device identification information to the control apparatus, and the control apparatus transmits the device identification information to the target safety device based on the routing information from the setting part.

Configuration 3

The support apparatus according to configuration 1, wherein the setting part transmits the determined device identification information to the control apparatus along with the network address of the target safety device, and the control apparatus determines a route to a target safety device based on the network address from the setting part and transmits the device identification information to the target safety device.

Configuration 4

The support apparatus according to configuration 1, wherein the setting part determines a route to a target safety device and transmits the device identification information to the target safety device.

Configuration 5

The support apparatus according to any one of configurations 1-4, wherein the setting part obtains, from the device identification information already set to any safety device, the network identification information of the network to which the safety device belongs, and determines the device identification information to other safety devices belonging to the same network as the safety device based on the obtained network identification information (S136).

Configuration 6

The support apparatus according to any one of configurations 1-5, wherein the setting part sets corresponding device identification information after the device identification information already set to the target safety device is cleared temporarily (S144).

Configuration 7

The support apparatus according to any one of configurations 1-6, further including a reception part (610) which receives from the user an arbitrary selection of the safety device to which the device identification information is to be newly set among one or a plurality of safety devices to which the status information is obtained.

Configuration 8

The support apparatus according to any one of configurations 1-7, wherein the device identification information is determined based on an IP (Internet Protocol) address of the target safety device and a SNN (Safety Network Number) set to the network to which the target safety device belongs.

Configuration 9

A support program (3062) executed in a computer (300) capable of communicating with a control apparatus (2; 200) network-connected to one or a plurality of safety devices (10), wherein each of the safety devices has a memory part (11) for keeping device identification information (54) that specifies the device itself, and the support program makes the computer execute:

a step (S100, S104) to refer, in each network, to a connection setting list (244) that defines a network address of a safety device belonging to the network, and obtain status information respectively from the one or a plurality of safety devices network-connected to the control apparatus;

a step (S108, S110, S120-S134, S138, S146) to selects, based on the status information of each safety device, the safety device to which the device identification information is to be newly set among the one or a plurality of safety devices to which the status information is obtained; and a step (S112, S136, S150, S152) to determine and set corresponding device identification information for each of the selected safety devices in accordance with an instruction from a user based on network identification information set for the network to which each safety device belongs and a network address of each safety device.

Configuration 10

A setting method to one or a plurality of safety devices (10) network-connected to a control apparatus (2; 200), wherein each of the safety devices has a memory part (11) for keeping device identification information (54) that specifies the device itself, and the setting method includes:

a step (S100, S104) to refer, in each network, to a connection setting list (244) that defines a network address of a safety device belonging to the network, and obtain status information respectively from the one or a plurality of safety devices network-connected to the control apparatus;

a step (S108, S110, S120-S134, S138, S146) to selects, based on the status information of each safety device, the safety device to which the device identification information is to be newly set among the one or a plurality of safety devices to which the status information is obtained; and a step (S112, S136, S150, S152) to determine and set corresponding device identification information for each of the selected safety devices in accordance with an instruction from a user based on network identification information set for the network to which each safety device belongs and a network address of each safety device.

In the control system of this embodiment, required identification information can be easily set even when multiple safety devices are connected the same network.

It should be considered that the embodiment disclosed here is illustrative instead of limitative in all aspects. The scope of the present disclosure is shown by the claims instead of the description above and meanings equivalent to the claims and all modifications within the scope are intended to be included in the scope of the present disclosure.

What is claimed is:

1. A support apparatus capable of communicating with a control apparatus network-connected to one or a plurality of safety devices, wherein each safety device has a memory part for keeping device identification information that specifies a device itself, and the support apparatus comprises:

an obtaining part, which refers, in each network, to a connection setting list that defines a network address of a safety device belonging to the network, and obtains status information respectively from the one or a plurality of safety devices network-connected with the control apparatus;

a selecting part, which selects, based on the status information of each safety device, a safety device to which the device identification information is to be newly set among the one or a plurality of safety devices to which the status information is obtained; and a setting part, which determines and sets corresponding device identification information for each of the selected safety devices in accordance with an instruction from a user based on network identification information set for the network to which each safety device belongs and a network address of each safety device.

2. The support apparatus according to claim 1, wherein the setting part obtains routing information that shows a route from the control apparatus to a target safety device and transmits the determined device identification information to the control apparatus, and
the control apparatus transmits the device identification information to the target safety device based on the routing information from the setting part.

3. The support apparatus according to claim 1, wherein the setting part transmits the determined device identification information to the control apparatus along with a network address of a target safety device, and
the control apparatus determines a route to the target safety device based on the network address from the setting part and transmits the device identification information to the target safety device.

4. The support apparatus according to claim 1, wherein the setting part determines a route to a target safety device and transmits the device identification information to the target safety device.

5. The support apparatus according to claim 1, wherein the setting part obtains, from the device identification information already set to any safety device, the network identification information of the network to which the safety device belongs, and determines the device identification information to other safety devices belonging to the same network as the safety device based on the obtained network identification information.

6. The support apparatus according to claim 2, wherein the setting part obtains, from the device identification information already set to any safety device, the network identification information of the network to which the safety device belongs, and determines the device identification information to other safety devices belonging to the same network as the safety device based on the obtained network identification information.

7. The support apparatus according to claim 3, wherein the setting part obtains, from the device identification information already set to any safety device, the network identification information of the network to which the safety device belongs, and determines the device identification information to other safety devices belonging to the same network as the safety device based on the obtained network identification information.

8. The support apparatus according to claim 4, wherein the setting part obtains, from the device identification information already set to any safety device, the network identification information of the network to which the safety device belongs, and determines the device identification information to other safety devices belonging to the same network as the safety device based on the obtained network identification information.

9. The support apparatus according to claim 1, wherein the setting part sets corresponding device identification information after the device identification information already set to a target safety device is cleared temporarily.

10. The support apparatus according to claim 2, wherein the setting part sets corresponding device identification information after the device identification information already set to the target safety device is cleared temporarily.

11. The support apparatus according to claim 3, wherein the setting part sets corresponding device identification information after the device identification information already set to the target safety device is cleared temporarily.

12. The support apparatus according to claim 4, wherein the setting part sets corresponding device identification information after the device identification information already set to the target safety device is cleared temporarily.

13. The support apparatus according to claim 5, wherein the setting part sets corresponding device identification information after the device identification information already set to a target safety device is cleared temporarily.

14. The support apparatus according to claim 6, wherein the setting part sets corresponding device identification information after the device identification information already set to a target safety device is cleared temporarily.

15. The support apparatus according to claim 7, wherein the setting part sets corresponding device identification information after the device identification information already set to a target safety device is cleared temporarily.

16. The support apparatus according to claim 8, wherein the setting part sets corresponding device identification information after the device identification information already set to a target safety device is cleared temporarily.

17. The support apparatus according to claim 1, further comprising a reception part which receives from the user an arbitrary selection of a safety device to which the device identification information is to be newly set among the one or a plurality of safety devices to which the status information is obtained.

18. The support apparatus according to claim 1, wherein the device identification information is determined based on an IP (Internet Protocol) address of the target safety device and a SNN (Safety Network Number) set to the network to which the target safety device belongs.

19. A non-transitory computer readable recording medium storing a support program executed in a computer capable of communicating with a control apparatus network-connected to one or a plurality of safety devices, wherein each safety device has a memory part for keeping device identification information that specifies a device itself, and the support program makes the computer execute:
a step to refer, in each network, to a connection setting list that defines a network address of a safety device belonging to the network, and obtain status information respectively from the one or a plurality of safety devices network-connected with the control apparatus;
a step to selects, based on the status information of each safety device, the safety device to which the device identification information is to be newly set among the one or a plurality of safety devices to which the status information is obtained; and
a step to determine and set corresponding device identification information for each of the selected safety devices in accordance with an instruction from a user based on network identification information set for the network to which each safety device belongs and a network address of each safety device.

20. A setting method to one or a plurality of safety devices network-connected with a control apparatus, wherein each safety device has a memory part for keeping device identification information that specifies a device itself, and the setting method comprises:
a step to refer, in each network, to a connection setting list that defines a network address of a safety device belonging to the network, and obtain status information respectively from the one or a plurality of safety devices network-connected with the control apparatus;
a step to selects, based on the status information of each safety device, the safety device to which the device identification information is to be newly set among the one or a plurality of safety devices to which the status information is obtained; and a step to determine and set corresponding device identification information for each of the selected safety devices in accordance with an instruction from a user based on network identification information set for the network to which each safety device belongs and a network address of each safety device.

\* \* \* \* \*